United States Patent [19]
Allen et al.

[11] 4,087,750
[45] May 2, 1978

[54] RECEIVER FOR DETECTING AND ANALYZING AMPLITUDE OR ANGLE MODULATED WAVES IN THE PRESENCE OF INTERFERENCE

[75] Inventors: Joseph A. Allen, Eatontown; William R. Fuschetto, Freehold, both of N.J.

[73] Assignee: The United States of America as represented by the Secretary of the Army, Washington, D.C.

[21] Appl. No.: 731,662

[22] Filed: May 23, 1968

[51] Int. Cl.² .................. H04B 1/10; H04B 17/00
[52] U.S. Cl. ............................. 325/363; 325/346; 325/473; 325/476; 325/482
[58] Field of Search ............ 325/344, 348, 346, 472, 325/476, 481, 482, 473, 363; 324/77 A, 77 B Primary Examiner—Howard A. Birmiel
Attorney, Agent, or Firm—Nathan Edelberg; Sheldon Kanars; Jeremiah G. Murray

[57] ABSTRACT

This receiver includes in its IF channel a summing network by means of which the output of a calibrated reference oscillator may be added to the received signals. The frequency and amplitude of the reference oscillator are adjusted to match those of a desired one of several co-channel signals which may be simultaneously present in the IF channel. The combined signals are amplitude limited and applied to a frequency deviation detector in which the wide frequency deviations caused by the interaction of the reference and desired signal are detected. The technique can be used to demodulate angle or amplitude modulated signals obscured by jamming signals and to measure the frequency and amplitude of signals which are similarly obscured.

7 Claims, 2 Drawing Figures

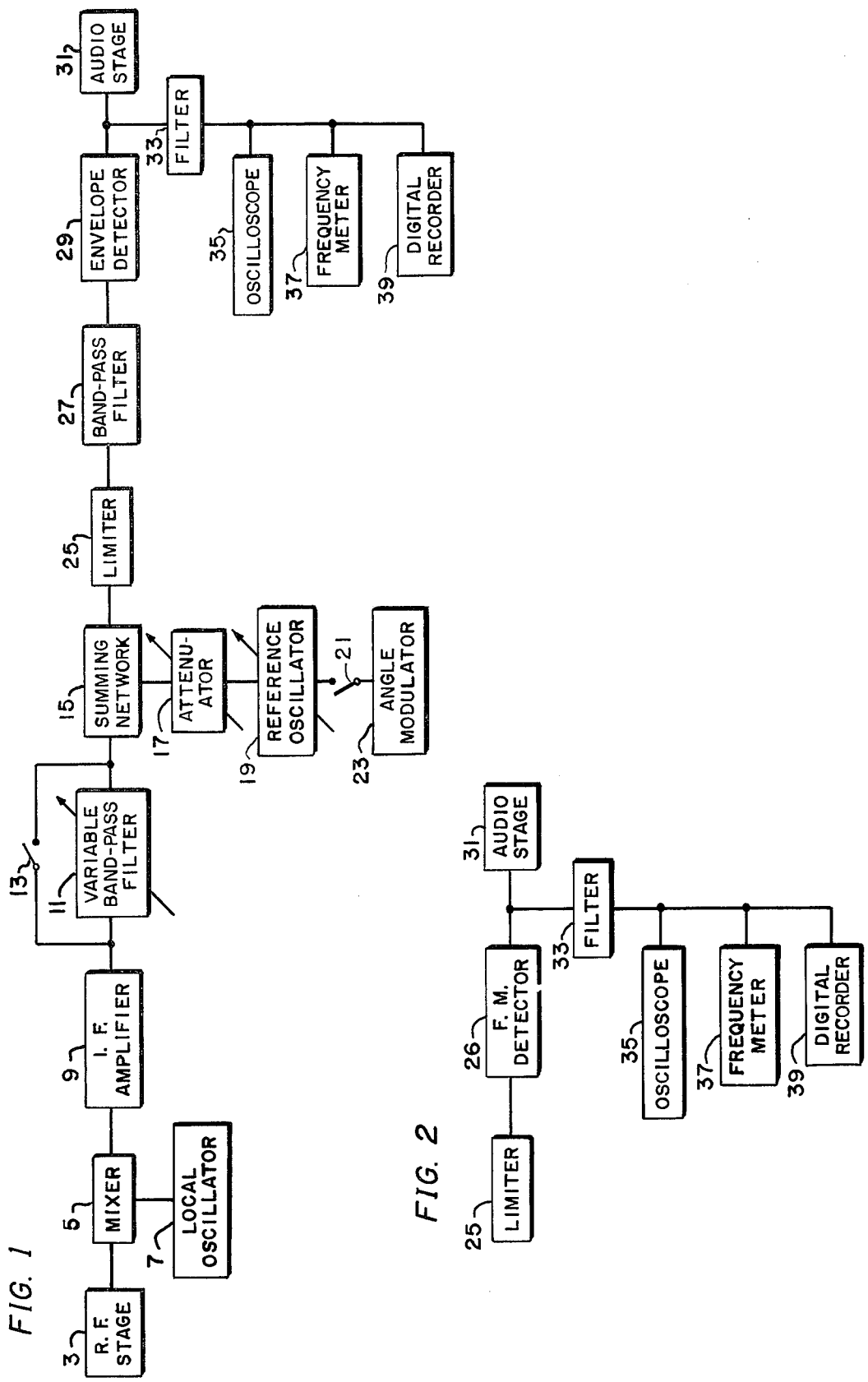

RECEIVER FOR DETECTING AND ANALYZING AMPLITUDE OR ANGLE MODULATED WAVES IN THE PRESENCE OF INTERFERENCE

The invention described herein may be manufactured, used, and licensed by or for the Government for governmental purposes without the payment to us of any royalty thereon.

The present invention relates to a radio receiver which is adapted to receive and demodulate either amplitude or angle modulated signals even though the signals may be obscured by a stronger co-channel signal. In an ordinary FM receiver, the capture effect causes the weaker of two co-channel signals to be suppressed or captured by a stronger signal. If the stronger signal happens to be an enemy jamming signal and the weaker signal a friendly one which it is desired to receive, the capture effect of the ordinary receiver will be a disadvantage. Specialized military receivers have been designed which do not exhibit the capture effect or which enhance the weaker signal to permit reception thereof under jamming conditions. The present circuitry is a receiver of this latter type which is capable of receiving either frequency, phase, or amplitude modulated signals in the presence of either modulated or continuous jamming signals. The circuitry further includes means for measuring various parameters of incoming signals, for example, the amplitude, carrier frequency, and type of modulation thereon. The general principle of operation involves inserting in or adding to the intermediate frequency (IF) channel of a superheterodyne receiver a reference signal of controllable frequency and amplitude which may be selectively angle modulated or unmodulated. The combined reference and received signals are then amplitude limited to produce IF signals with only frequency or phase modulation thereon. In detecting frequency or phase modulated received signals, the reference signal is unmodulated, and is frequency or phase modulated in detecting amplitude modulated received signals. The deviation of the reference oscillator is made significantly smaller than that of the received signal to prevent undesired interaction therebetween. The reference signal and the desired received signal are approximately equalized in amplitude at the limiter input and the reference signal carrier or center frequency is set to coincide with that of the desired received signal. The limiter output will comprise a signal which has a theoretically infinite frequency spectrum resulting from large frequency deviations or excursions which recur at the same rate as the modulation of the desired incoming signal. By suitable detection circuitry, this modulation rate can be rendered audible to provide a readable but distorted version of the desired modulation. Undesired received signals are discriminated against by virtue of the fact that they differ substantially in amplitude from the reference signal and for this reason the aforementioned frequency deviations are not produced with anywhere near the same intensity for the undesired signals. When the desired signal is amplitude modulated, the reference signal amplitude is set at approximately the average or unmodulated value of the desired signal. Since the desired signal will then pass through the reference signal amplitude at the modulation rate, the limiter output will comprise a signal with frequency deviations at the same rate as the modulation on the desired AM signal.

It is thus an object of this invention to provide an improved anticapture receiver.

A further object of the present invention is to provide a receiver adapted to receive and demodulate both amplitude and angle modulated signals in the presence of undesired co-channel signals.

Still another object of the invention is to provide a novel AM-FM anti-capture receiver which includes circuitry for analyzing received signals.

A further object of this invention is to provide a novel method for measuring the strength or power and frequency of a received signal in the presence of interference.

These and other objects and advantages of the invention will become apparent from the following detailed description and drawing, in which:

FIG. 1 is a block diagram of a receiver embodying the principles of this invention, and FIG. 2 is a modification thereof.

In FIG. 1, the RF stage 3, mixer 5, local oscillator 7 and intermediate frequency amplifier 9 will all perform in the usual manner of such components in a superheterodyne receiver to convert signals picked up over a wide frequency range to a single intermediate frequency. The output of amplifier 9 is applied to variable bandpass filter 11, which has a narrower bandwidth than IF amplifier 9 and the center frequency of filter 11 is variable over the frequency range of amplifier 9. Thus filter 11 permits the selection of any desired portion of the passband of amplifier 9, which is useful in certain applications for discriminating against undesired signals in certain frequency ranges. The switch 13 is provided so that the filter 11 may be inserted in the IF channel or by-passed, as the conditions require. The summing network 15 is a means for combining in a linear manner the received signals from the output of the IF channel with the reference signal derived from oscillator 19. A calibrated attenuator 17 permits the injected reference signal to be adjusted to the proper amplitude and the amplitude noted. The angle modulator 23 is connectible to oscillator 19 by means of switch 21. When this switch is closed, the modulator 23 will either frequency or phase modulate the output of reference oscillator. When the switch is open, the reference oscillator is unmodulated. The term angle modulation is a generic one including both frequency and phase modulation. The summing network 15 may comprise merely a simple resistor matrix for linearly adding or superimposing the reference signal and all of the simultaneously received signals. The output of the summing network is applied to an amplitude limiter 15, which may comprise one or more stages and is preferably a so-called hard limiter, so that all amplitude variations of all of the input signals are substantially absent from the output. The limiter bandwidth is made substantially wider than that of IF amplifier 9. The limiter output is applied to bandpass filter 27 which is tuned to a band of frequencies either above or below the passband of the IF amplifier 9. The theoretically instantaneous wide frequency deviations or excursions mentioned above, resulting from the interaction of the reference and desired signal will sweep through the passband of filter 27, thus producing at the output of this filter a train of ac pulses similar to radar pulses. The envelope detector 29 removes the carrier from the output of filter 27 to yield a train of dc or video pulses which are applied to audio stage 31 wherein any audio or voice modulation therein is rendered audible. The detector output is also passed through filter 33 which removes the frequency of angle modulator 23 from the signal, and passes the remainder in parallel to three devices used for analyzing and measuring the parameters of the selected or desired received signal. These devices are the oscilloscope 35, frequency meter 37 and digital detector 39.

The operation of the receiver of FIG. 1 is as follows: Assume that the switch 13 is closed to bypass filter 11, and further that two co-channel signals are being received, one a frequency or phase modulated signal and the second a stronger interfering signal which may be angle modulated or unmodulated. Since the desired signal is angle modulated, the switch 21 is opened so that the reference oscillator 19 is unmodulated. The frequency of the reference oscillator 19 and the setting of the attenuator are then adjusted by trial and error until the amplitude of the reference signal at the input to summing network 15 equals that of the desired signal and the reference frequency equals the desired signal carrier or center frequency. In such condition of equal desired and reference frequency inputs to the summing network, the limiter output will include a series of extreme frequency deviations which are produced each time the desired modulated signal approaches its carrier frequency. The settings of the reference oscillator frequency and the attenuator will coincide with the frequency and amplitude of the desired signal in the output of the IF amplifier, thus providing accurate frequency and power measurements of the selected signal in the IF channel. These spikes of frequency modulation are caused by the rapid, nearly instantaneous phase reversals which occur in the resultant or vector sum of two signals of the same amplitude but different instantaneous frequency. This follows from the fact that an instantaneous phase change theoretically requires an infinite frequency deviation. This phenomena is similar to that discussed in detail in the Hansell U.S. Pat. No. 2,388,052 issued on Oct. 30, 1945. In the cited patent it is stated that the magnitude or maximum frequency deviation is proportional to the sum of the signal amplitudes divided by their difference and will be therefore theoretically very large when the two signals are of equal amplitude. Also the sense or direction of the frequency deviation reverses as the relative frequencies of the two signals change. It should be added that if an unmodulated reference is combined with an unmodulated received signal, both of the same frequency the resultant frequency in the limiter output will undergo no rapid phase reversals necessary to generate frequency deviations. In the present circuitry, the two signals are made identical in both amplitude and carrier frequency. In such condition the angle modulation of one of the signals will produce theoretically infinite frequency deviations accompanied by a continuous spectrum. Also, if the angle modulated reference oscillator amplitude is varied with attenuator 17, and the received signal is unmodulated, the maximum frequency deviation will occur when the two signals are of equal amplitude and equal carrier frequency at the input of the summing network. Thus the amplitude of the unmodulated received signal may be measured by combining it with an angle modulated reference signal. Returning to the case of the angle modulated received signal and the unmodulated reference signal of equal amplitude, the undesired interfering signal in this case, if it is either larger or smaller in amplitude than the desired signal, will not produce any appreciable frequency deviations, and it will be effectively suppressed. The filter 27 has a passband which is within the spectrum of the large frequency deviations produced by the equal-amplitude signals, but is outside the passband of the intermediate frequency channel, so that none of the received or reference signals which have not been substantially deviated in frequency can pass therethrough. As stated above, the output of the filter 27 will comprise a series of alternating current pulses which recur at the modulation frequency of the desired angle modulated received signals. Whenever the desired and reference frequencies instantaneously coincide, the large frequency deviations are generated. This frequency coincidence will recur at the modulation frequency of the desired signal. This is the reason for the train of ac pulses at the output of the filter 27. The detection circuitry comprising filter 27 and the succeeding circuitry thus recovers or detects only the modulation rate of the desired signal and not the amplitude thereof. Thus a detected analog audio signal would be distorted, but the frequency information alone is usually sufficient to produce intelligible speech. Such signals are sometimes known as infinitely clipped speech.

The filter 33 may be a high or low pass filter which is used for removing the frequency of angle modulator 23 from output of envelope detector 29 before the modulation frequency information is applied to the oscilloscope 25, the frequency meter 37 and digital detector 39. The detected modulation may be observed on the oscilloscope 35, its frequency can be determined by means of meter 37 and binary or digital signals may be detected or recorded on recorder 39, which may comprise one or more multivibrators for recording frequency shift keyed signals and the like.

It should be noted that the above-described procedure for detecting angle modulated signals will also work if the interfering or undesired signal is amplitude modulated, provided the range of amplitudes of the undesired signal does not include that of the angle modulated desired signal.

If the desired signal is amplitude modulated, the reference signal is set to the carrier frequency of the desired AM signal and at an amplitude which is within the amplitude range of the AM signal, preferably at the average or unmodulated amplitude thereof. The angle modulator 23 is connected to the reference oscillator and set at a frequency outside the range of the modulation on the desired AM received signal. Thus if the received signal is voice frequency modulated, the modulation frequency of oscillator 19 would be set either in the subsonic or supersonic region. With such a reference signal applied and combined with the received AM signal, frequency excursions would be produced each time the instantaneous amplitude of the received signal passes through the reference frequency amplitude. This occurs at the modulation rate of the AM received signal, thus the succeeding frequency detection circuitry will recover this modulation rate in the same way as in the previously-described case where an angle modulated signal was received. Any interfering or undesired signals of any type of modulation which do not fall within the amplitude range of the desired AM signal will be discriminated against since such signals never coincide in amplitude with the desired signal and no large frequency excursions will be produced.

FIG. 2 shows alternate frequency (or angle) modulation detection circuitry which may be substituted for the bandpass filter 27 and envelope detector 29. The frequency modulation detector 26 is substituted for the two mentioned elements of FIG. 1, all other elements of FIG. 2 being the same as the correspondingly referenced elements of FIG. 1. The detector 26 may have a center frequency which is either well above or below the receiver intermediate frequency, as does the filter 27 of FIG. 1. The detector 26 will thus produce a dc pulse each time the limiter output passes through its tuning range. Thus there is no carrier frequency at the detector output and no envelope detector is required as in FIG. 1.

It should now be apparent that the present invention provides a versatile and useful tool for the selective reception and analysis of both AM, FM and phase modulated signals under various conditions which would render such signals unintelligible to normal receiving equipment. While the invention has been described in connection with illustrative embodiments, modifications thereof are possible without departing from the inventive concepts described herein, accordingly the invention should be limited only by the scope of the appended claims.

What is claimed is:

1. A radio receiver comprising, an intermediate frequency channel, a summing network connected to said channel for combining received signals in said intermediate frequency channel and a reference signal, said reference signal being adjustable in frequency and amplitude, and means for selectively angle modulating said reference signal, a wideband amplitude limiter connected to the output of said summing network, and means connected to the output of said limiter to detect frequency deviations outside of the passband of said intermediate frequency channel.

2. The circuitry of claim 1 wherein said last-named means comprises a band pass filter tuned outside of the passband of said intermediate frequency channel and an envelope detector.

3. The circuitry of claim 1 wherein said last-named means comprises frequency modulation detector tuned outside of the passband of said intermediate frequency channel.

4. The circuitry of claim 1 wherein an audio stage and a filter are connected in parallel to the output of said last-named means, and an oscilloscope, a frequency meter and a digital recorder connected in parallel to the output of said filter, said filter being tuned to block the modulation frequency of said reference oscillator.

5. A radio receiver comprising, a channel adapted to receive desired incoming signals which may be accompanied by interfering signals, means to superimpose a reference signal on the signals of said channel, means to adjust the amplitude of said reference signal, means to amplitude limit the resulting superimposed signals and to convert the frequency deviations of the limited signal outside of the passband of said channel to a train of direct current pulses, and means to monitor said train of pulses.

6. The method of measuring the amplitude of a received or unknown signal comprising the steps of linearly combining said signal with a reference signal of the same frequency and a calibrated variable amplitude, amplitude limiting said combined signals and detecting the frequency excursions of said limited signals, varying the amplitude of said reference signal until said excursions are maximized whereby the calibrated amplitude of said reference signal equals that of the received or unknown signal.

7. The method of measuring the frequency of a received or unknown signal comprising the steps of linearly combining said signal with a reference signal of the same amplitude and with a calibrated variable frequency, amplitude limiting said combined signals and detecting the frequency excursions of said limited signals, varying the frequency of said reference signal until said excursions are maximized, whereby the calibrated frequency of said reference signal equals that of the received or unknown signal.

* * * * *